Sept. 11, 1934.  E. J. GOODALE  1,973,062
APPARATUS FACILITATING GERMICIDAL TREATMENT AND WASHING OF FRUITS
Filed Nov. 17, 1931   2 Sheets-Sheet 1
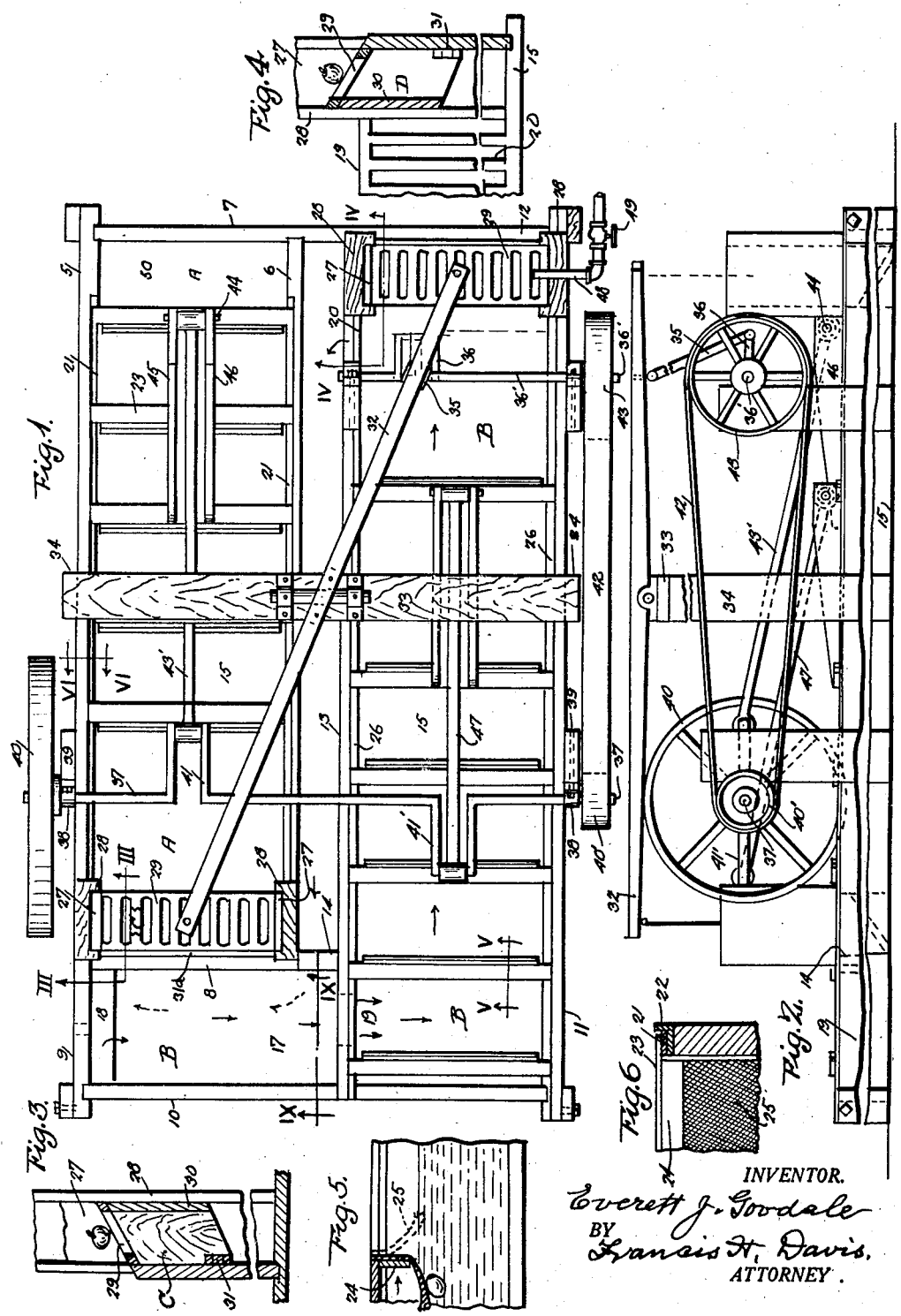
INVENTOR.
Everett J. Goodale
BY Francis H. Davis,
ATTORNEY.

Sept. 11, 1934.  E. J. GOODALE  1,973,062
APPARATUS FACILITATING GERMICIDAL TREATMENT AND WASHING OF FRUITS
Filed Nov. 17, 1931  2 Sheets-Sheet 2
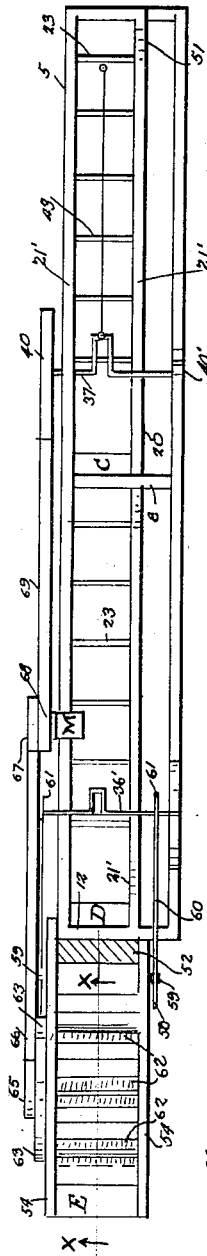
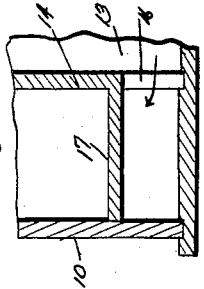
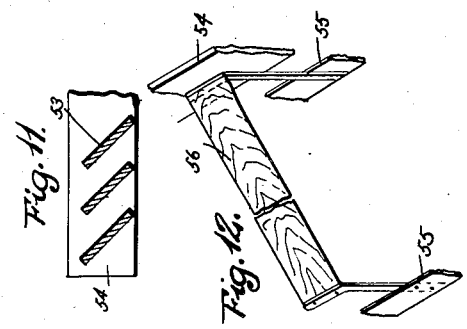
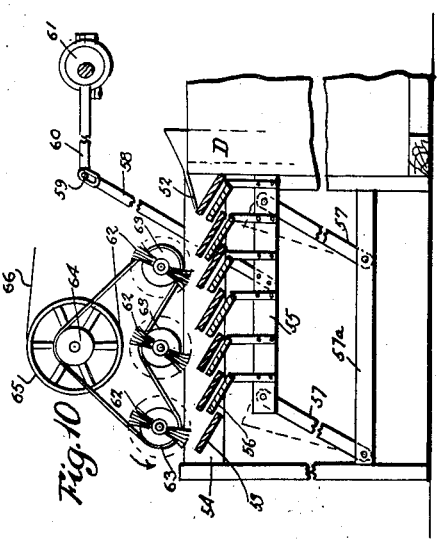
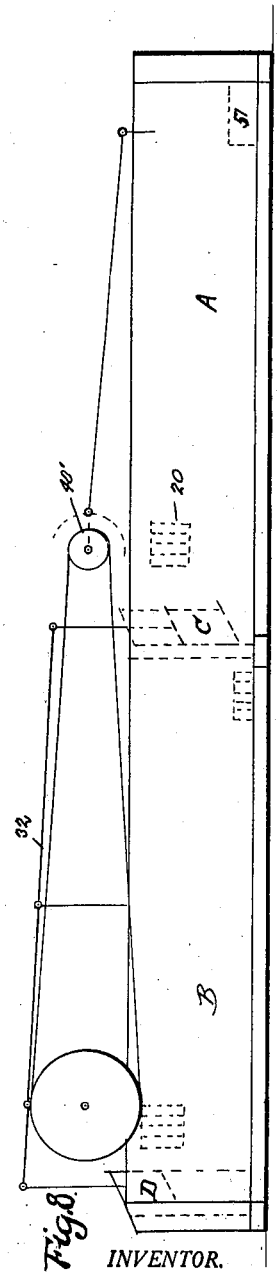
INVENTOR.
Everett J. Goodale
BY Francis H. Davis.
ATTORNEY.

Patented Sept. 11, 1934

1,973,062

UNITED STATES PATENT OFFICE 1,973,062

APPARATUS FACILITATING GERMICIDAL TREATMENT AND WASHING OF FRUITS

Everett J. Goodale, Watsonville, Calif., assignor of one-half to George H. Jocelyn, San Jose, Calif.

Application November 17, 1931, Serial No. 575,666

1 Claim. (Cl. 146—194)

This invention relates to an apparatus facilitating germicidal treatment, washing, drying and polishing of fruits, and for the purpose of this disclosure is illustrated as an apple washer; although I do not wish to be confined in its use to the treatment of apples exclusively.

My invention is in response to the need for apparatus adapted to cleanse apples from foreign matter such as dirt incidental to gathering; the need for chemical treatment to rid and neutralize the fruit of poisonous residue from the spraying; the need to treat the fruit with a germicidal agent to prevent the spread of the codlin moth and other well known pests, as well as to improve the general appearance and attractiveness of the pack.

The objects of my invention comprise the following desiderata and others which may appear as the specification unfolds:—

To provide a tank, A, containing a treating solution having germicidal and spray-neutralizing properties, and means whereby the solution is kept in circulation.

To provide a tank B cooperative with tank A and containing pure rinsing water, and means whereby the water is constantly kept in circulation and replenished.

To provide a fruit intake for tank A, and means to automatically transfer the apples from said A tank to tank B.

To provide for tank A, a reciprocative rack having flexible washer elements adapted and arranged to tumble and impel the floating apples forward until within range of said automatic transfer means.

To provide for tank B, a rack the duplicate of that in tank A, and having washer elements arranged to impel the apples forward to an automatic means to discharge the rinsed apples, said means acting in alternate succession with said automatic means for transferring apples from tank A to tank B.

To provide certain renewable wear-runners for said racks to move on.

To provide said washer elements with a non-flexible backing on one side thereof, and to secure said elements to cross bars in such a manner that more pressure will be brought to bear upon the apples on the forward stroke of the rack than on the back stroke, whereby a continuous forward traverse is imparted to the apples; as well as an impulse to circulate the liquid contained within the respective tanks.

To provide a spraying means adapted to play clean water on the apples at the moment of discharge from tank B.

To provide certain shuttle elements adapted, progressively, to advance and rotate the treated objects beneath a series of transverse, flexible, air-circulating elements adapted and arranged to rid the objects of adherent moisture and at the same time impart a polish thereto; which, together with the previous germicidal treatment assures an attractive pack which is externally clean and wholesome, and sterile against the spread of injurious pests and diseases.

To provide certain screen or grid openings in certain walls of the respective tanks, and certain traps to collect floating trash so that it may be removed from the apparatus.

To provide a common drive shaft and associated gearing adapted to operate said parts and elements in timed relation, together with other objects and advantages which will be particularly pointed out in the claim and illustrated in the drawings hereto attached and made part hereof, in which,—

Figure 1 shows a top plan view of tanks A and B arranged in parallelism.

Figure 2 is a side elevational view of Figure 1 showing a longitudinal break in the tank.

Figure 3 is a section taken on the line III—III of Figure 1.

Figure 4 is a section taken on the line IV—IV of Figure 1.

Figure 5 is a section taken on the line V—V of Figure 1.

Figure 6 is a section taken on the line VI—VI of Figure 1.

Figure 7 shows a diagrammatic plan of another embodiment of my invention.

Figure 8 is a diagrammatic elevational view of Figure 7.

Figure 9 is a section taken on the line IX—IX of Figure 1.

Figure 10 is a section taken on the line X—X of Figure 7.

Figure 11 is a broken detail showing the fixed members of the shuttle elements.

Figure 12 is a broken projection showing one member of the movable element of the shuttle.

Similar reference indicia refer to similar parts throughout the several views.

In carrying out my invention I provide the cooperative tanks A and B. Tank A is bounded by the side walls 5 and 6 and the end walls 7 and 8. Tank B is bounded by the portion 9 of wall 5, the end wall 10, the side wall 11, the portion 12 of the end wall 7. The partition 13 is off-set parallel to the wall 6 by the spacer 14 which serves as a trap to catch floating trash; said partition extends downwardly from the upper plane of the respective tanks to the bottom 15, which forms the base of the apparatus.

By reference to Figure 9 it will be noted that the partition 13 is apertured at 16, at which point the cover member 17 is secured.

It will be noted that the space 18 exists between the end of said cover and the interior of the wall portion 9; a space 19 being provided in the partition 13 above the cover 17.

Reference being had to Figure 4, the bars 20 are disposed in spaced relation adjacently near the discharge end of the tank B, according to the embodiment of my invention as shown in Figures 1 and 2.

In said embodiment, associated with tank A the rack 21 of suitable length, is slidably mounted for longitudinal reciprocation on renewable wear-runners as 22 attached to the upper edges of the said tank, as is well shown in Figure 6.

The rack 21 has the cross pieces 23 at suitably spaced intervals of its length, the slats 24 secure vertically beneath the forward edge of each respective cross-piece and depend suitably below.

Flexible washing elements as 25 are secured to the upper edges of the respective cross pieces as is well shown in Figure 5, from which it will be noted that when said rack is moved clockwise the element 25 deflects backwardly from the lower edge of said slat and consequently bears down hard on floating objects as apples, thus imparting to them brisk rotation and an active tendency for advance movement toward the forward end of the tank; whereas, on the counter-clockwise stroke the element 25 swings from the upper edge of said slat and trails lightly over the apples; this repetitive action sets up a definite circulation of the contained fluid and carries the fruit completely throughout the length of the tank.

The tank B is equipped with the rack 26, similarly mounted, and equipped with similar washing elements, cross-pieces and slats to those above described pertaining to the rack 21.

The dipper elements C and D are both alike, and comprise respectively the side runners 27—27 adapted for up and down movement in guides as 28; the sloping ventilated shelf 29, the back 30 and the cross brace 31.

The function of the element C is to dip objects up out of the tank A and deposit them in the tank B. The element D lifts objects up out of the tank B. The ventilations facilitate the movement of said elements when submerged, and also admit fluid to drain into the respective tanks rather than be splashed over the adjacent wall, although due clearance is provided therebetween at 31a, Figure 1.

Alternate up and down movement is imparted to the elements C and D by suitable connections with the walking beam 32 pivotally mounted on the cross member 33 carried by the uprights 34 and 34; the walking beam is connected by the pitman 35 actuated by the crank 36 of the revoluble shaft 36'. It will be noted by reference to Figures 1 and 2 that the main drive shaft 37 is mounted in bearing 38 carried by the respective uprights 39 and 39 and is provided with the drive wheel 40 on the far side of Figure 1, while the near end of said shaft carries the drive pulley 40' connected by the belt 42 to the driven pulley 43 fast to the shaft 36'.

The diametrically opposed cranks 41 and 41' are provided on said drive shaft medially over each respective rack. The connecting rod 43' links the crank 41 to the rack 21, the far end of said rod being pivotally connected with said rack at 44 and mounted between the longitudinally-disposed members 45 and 46, said members being each of sufficient length to extend across a plurality of the cross-pieces 23, and thereby afford an efficient anchorage for said rod, as well as stout bracing to stiffen the rack element. The connecting rod 47 is similarly disposed and constructed, and secured with relation to the crank 41' and the rack element 26; each said rack and the respective connecting rods being of suitable length to provide the longitudinal displacement required for said racks.

In the embodiment shown in Figures 7 and 8 the same principle is involved, save that in this form, the respective tanks A and B are disposed in tandem. In this embodiment the rack 21' coacts simultaneously on the apples in the treating compartment A and with those in the rinsing compartment B. The rack 21' is slidable outside the dipper element C.

My novel drying-polishing element E is interengaged with the element D by traverse member 52 (Figure 7) which may or may not be ventilated, but is disposed at a suitable slope to carry rollable objects forward from shelf 29 into the first longitudinal pocket of said element E.

Said element comprises the novel and peculiar arrangement of louver-like fixed vanes 53 mounted in the same plane between the vertical sides 54—54 and in alinement with the tank B.

The cross bars 55 carry a series of slats 56 complemental to the vanes 53, and comprise a shuttling element adapted to vibrate said slats in unison medially between said vanes upon the parallel links 57—57 pivoted to the cross member 57a, said links being preferably four in number and suitably disposed to support said shuttle and maintain its true alinement. Levers as 58—58 extend deflectingly upward to longitudinally-slotted pivotal connection at 59—59 with the links 60—60 actuated by the eccentrics 61—61 carried by the shaft 36', rotation of which actuates the shuttle member in such a manner that objects which fall into any given space between adjacent vanes will be rolled over the vane immediately in front and deposited in the next vane space.

The drying-polishing elements comprise a series of parallel rotary brushes 62 arranged and disposed over said vane-gaps in the plane of said vanes. Said brushes, being diametrically constructed, act not only as frictional means for contact with objects passing therethrough; but also, by their rapid rotation act as fans which have a positive air drying effect.

It will be noted in Figure 10 that said brushes are severally provided with pulleys 63 which are arranged to rotate the middle brush in a counter direction to the other two, thereby setting up drying air eddies.

The master pulley 64 is belted to run the pulley 63 in the manner indicated, being driven by the pulley 65, in turn driven by the belt 66 by means of the pulley 67 fast to the shaft of the motor M.

The pulley 68, also fast to said motor shaft, transmits power through the belt 69 to the wheel 40.

It should be noted that the circulation in tank B carries the water through the bars 20 then traverses between the wall 6 and the partition 13, emerges in the direction of the arrow in Figure 4, passes under the cover 17, ascends through the space 18 and flows through the opening 19; thus having completed the circuit.

It will be noted in Figures 7 and 8 that the fluid in the tank A is caused to circulate through the openings 20 and 51.

It is believed that my invention and the advantages to be gained by the use thereof are fully explained. In reducing the invention to practice, certain minor features in construction, combination and arrangement of parts may necessitate alteration, to which the patentee is entitled, providing such alteration is comprehended in the scope of what is claimed.

What I claim is:—

In an apparatus of the kind described, a tank structure comprising a bottom, side walls, end walls, and a partition sub-dividing said tank into first and second compartments, a dipper element disposed within the first compartment against said partition, an outwardly-deflected transfer member carried by the dipper, a dipper element disposed within said second compartment against the end wall thereof and an outwardly deflected transfer member carried by said dipper, means to operate said dippers up and down; a reciprocative rack carried by said side walls and adapted for relative movement in respect to both said compartments outside the first dipper, means to reciprocate the rack, spaced cross-pieces carried by said rack, the respective inmost cross-piece spaced to clear said first dipper, and flexible elements depending from the advancing edge of said cross pieces.

EVERETT J. GOODALE.